United States Patent [19]
Beller

[11] Patent Number: 5,325,767
[45] Date of Patent: Jul. 5, 1994

[54] SPIT BASKET

[75] Inventor: Frank W. Beller, Aurora, Ill.

[73] Assignee: Belson Manufacturing Co., Inc., North Aurora, Ill.

[21] Appl. No.: 16,081

[22] Filed: Feb. 10, 1993

[51] Int. Cl.⁵ .............................................. A47J 43/18
[52] U.S. Cl. ..................................... 99/421 R; 99/427
[58] Field of Search ............ 99/419, 426, 427, 421 H, 99/421 R; 211/125, 181

[56] References Cited

U.S. PATENT DOCUMENTS

| | | | |
|---|---|---|---|
| 3,269,299 | 8/1966 | Nielsen | 99/427 |
| 3,315,591 | 4/1967 | Elliott | 99/427 |
| 3,839,050 | 10/1974 | Gordon | 99/427 |
| 4,442,762 | 4/1984 | Beller | 99/427 |
| 4,442,763 | 4/1984 | Beller | 99/427 |
| 4,625,634 | 12/1986 | Krüper | 99/427 |
| 4,688,477 | 8/1987 | Waltman | 99/427 |
| 4,882,985 | 11/1989 | Beller | 99/426 |
| 5,113,699 | 5/1992 | Soriano | 99/427 |

*Primary Examiner*—Timothy F. Simone
*Assistant Examiner*—Reginald L. Alexander
*Attorney, Agent, or Firm*—Lee, Mann, Smith, McWilliams Sweeney & Ohlson

[57] ABSTRACT

An improvement for a spit basket of the type having opposing sets of fingers for holding food items to be roasted. The spit basket is adjustable and provides for movement of the opposing fingers to close around an item to be cooked. The improvement comprises sets of double-skewer prongs engaged to said fingers in a transverse relation relative to a long axis of the spit basket whereby to be capable of piercing the carcass of the item to be cooked to enable the spit basket to retain the meat during roasting without slippage, shredding or bruising of the meat.

12 Claims, 1 Drawing Sheet

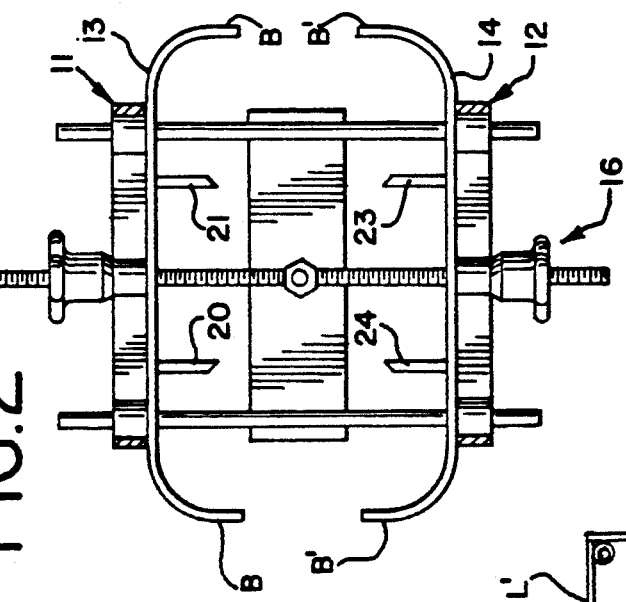
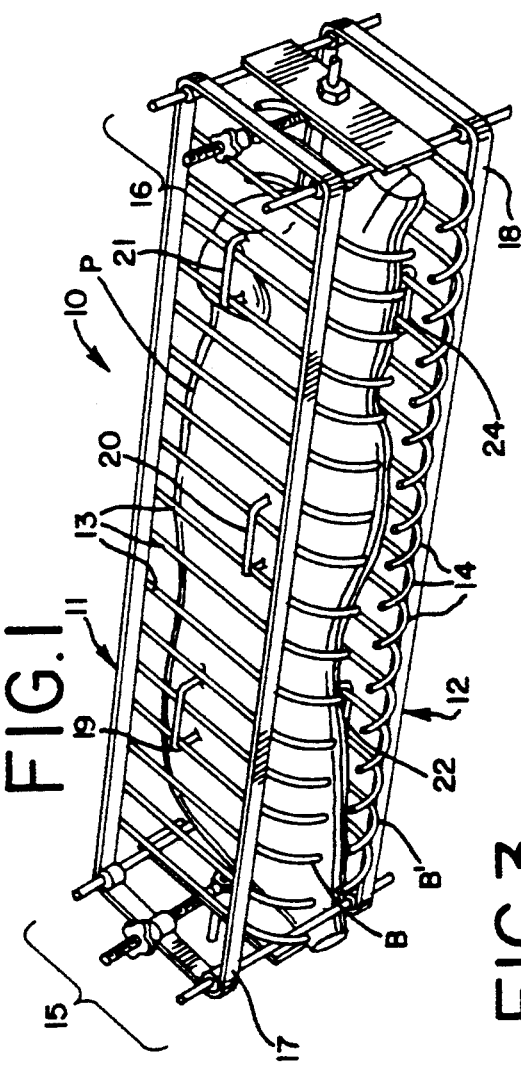
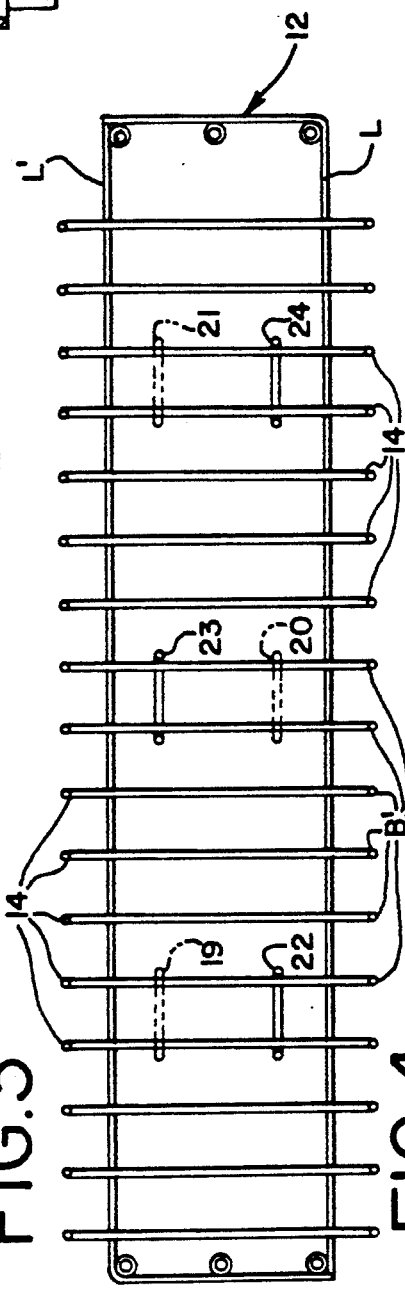
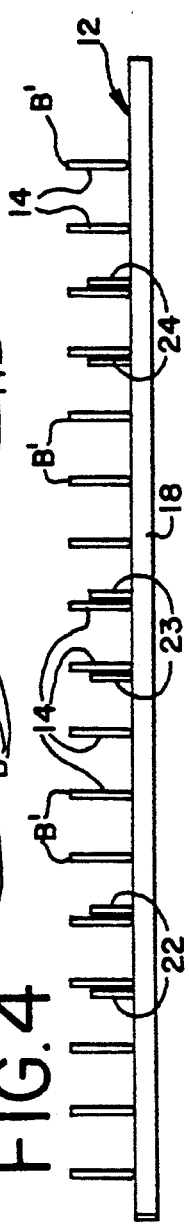

SPIT BASKET

BACKGROUND OF THE INVENTION

The invention is generally directed towards improving the holding capability of a spit basket. More specifically, the invention is directed to an improvement to a rotisserie-type spit basket. Even more in detail, the invention is directed toward improving the mechanical gripping structure of a spit basket of the type having opposing sets of fingers for holding a food item to be cooked therebetween.

Large outdoor meat roasters preferably have horizontal spit baskets that are rotated either by hand or mechanical means in a rotisserie fashion. Often, the spit baskets are adjustable so to be able to accommodate different sized food items such as pigs, lambs, venison, fowl and other relatively large items to be roasted.

One type of spit basket of the telescoping variety, having two sets of bow-shaped fingers that can be moved toward or away from each other for holding an item, is disclosed in my U.S. Pat. No. 4,442,762. Other devices utilizing such an adjustable basket are found in my U.S. Pat. Nos. 4,442,763 and 4,882,985.

While the rotisserie-type spit baskets can be used for different food items, it is primarily the object of most large outdoor roasters to be able to accommodate pigs usually in the size from 60 to 120 pounds. Because of this large weight and the necessity to rotate the spit for even cooking, it is important to securely hold the pig so that slippage and shredding of the carcass do not occur. As the meat cooks and becomes more tender, and grease and fat exude from the carcass, there is a tendency for the carcass to slip within the spit basket. The shredded meat can drop into the fire and cause flare-ups as well as the obvious physical damage and bruising to the meat to be cooked. It is accordingly an object of the invention to provide an enhanced securement structure for a spit basket, preferably of the type having opposing sets of fingers, whereby to prevent the slippage of large food items during rotisserie roasting.

It is a further object of the invention to provide such an improvement for a spit basket of the type having opposing telescoping sets of fingers or rods, which close to securely retain the food item above a heat source.

It is an allied goal of the invention to provide an improved carcass-piercing structure for securing the item to be roasted within a spit basket and for it to be adjustable in conjunction with the spit basket to close and open around the item to be cooked.

SUMMARY OF THE INVENTION

The invention can be summarized as providing staggered sets of prongs mounted to the fingers of a spit basket. The prongs are arranged transverse to the long axis of the spit and are provided to pierce the carcass for the holding thereof upon the closure of the spit around the item to be cooked. The invention is primarily directed toward providing prongs which are staggered at either of two opposing sets of adjustable spit basket fingers and provide interior securement for a large carcass when the spit basket fingers have been adjusted to close and circumscribe the food item.

BRIEF DESCRIPTION OF THE DRAWINGS

FIG. 1 shows an adjustable spit basket in a perspective view gripping a pig and wherein the improving prong structures are shown extending to engage the carcass;

FIG. 2 is an end view of the spit basket and showing the improvement comprising the prongs extending inwardly of the basket configuration;

FIG. 3 is a plan view of the lower set of fingers shown in FIG. 1 and having imposed thereon in broken lines the prongs of the upper fingers to illustrate the staggered alignment with respect to the lower prongs; and, FIG. 4 is a front elevational view of one of the sets of fingers as shown in FIG. 1 showing the extension of the prong structures interiorly of the basket configuration.

DETAILED DESCRIPTION OF THE INVENTION

In the drawing FIGS. 1-4, like reference numerals refer to the same elements throughout.

FIG. 1 shows in perspective an adjustable spit basket 10 holding a large item to be cooked, embodied as a pig P for roasting. The spit basket 10 is adjustable as explained in my U.S. Pat. No. 4,442,762 and comprises a first finger assembly 11 and a second finger assembly 12 that include opposing sets of bowed fingers 13 and 14, respectively. Opposite end adjustment rods assemblies 15, 16, allow for the relative motion of the assemblies 11 and 12 as explained in my said patent, but form no part of the present invention. The sets of fingers 13, 14 of said assemblies are mounted to rectangular-like spit frames 17, 18, thereof, wherein outwardly thereof the fingers 13, 14 at ends B, $B^1$, as best viewed in FIG. 1, to grip around the pig P. The fingers 13, 14 are staggered longitudinally relative to each other whereby the bowed ends B, $B^1$ may telescope past one another when the assemblies 15, 16 closely tighten the finger assemblies 11, 12 toward each other in order to prevent abutment and allow smaller items to be gripped.

The shapes of the fingers 13, 14, in conjunction with their staggered arrangement, provide for a firm gripping action around the pig P. To further improve this gripping function, it has been found that additional securement in the form of prongs 19, 20, 21 at the assembly 11, and 22, 23, 24 at the assembly 12, significantly enhance the retention of the pig P during cooking. The prongs 19-24 prevent slippage, which otherwise might bruise and shred the meat to be cooked. The prongs 19-24 are preferably identical constructions and have a double skewer configuration for piercing the carcass of the pig P. The prongs 19-24 are each generally U-shaped, wherein the base of each U, as shown in FIG. 1, is weld-attached around the outside of two adjacent fingers of the sets of fingers 13 and 14. The prongs 19-24 extend generally transverse to the long axis of the spit basket 10 and inwardly thereof at staggered arrangements, best shown in connection with FIG. 3. For ease of explanation of the staggered spacing, the prongs 19, 20 and 21 of the finger assembly 11 are shown in broken lines in FIG. 3, which also shows in top plan view the finger assembly 12. It will be seen that the finger assembly 12 has the frontward two prongs 22, 24 closer to one of the longer sides L of the rectangular configuration and the third prong 23 closer to the other long side $L^1$ of the rectangular configuration. Opposingly, the prongs 19, 20, 21 of the upper finger assembly 11 have rearward two prongs 19, 21 located generally closer to the other longer side $L^1$ of the rectangular configuration and spaced at about the same distance therefrom as prong 23. The prong 20 is spaced closer to the long side L of the rectangular configuration at about the same distance therefrom as the prongs 22, 24, best viewed in FIG. 3. Taken in respect of the longitudinal direction, the prongs 19-24 are shown spaced preferably at the ¼, ½ and ¾ points of the spit basket 10. Specifically, the prongs 19 and 22 are located at the ¼ point from the left-hand side of the rectangular configuration, the prongs 20, 23 are spaced longitudinally at the half point, and the prongs 21, 24 are spaced generally at the ¾ point, as best understood in connection with FIG. 3.

FIGS. 2 and 4 show the basket-inward projection or extensions of the prongs 19-24, whereby they provide improved food securement in combination with the bow-shaped ends B, B¹ of the fingers 13, 14, respectively. In reference to the direction transverse to the longitudinal axis of the basket 10, the prongs are spaced about at ½ of the distance from the ends of the closest bow-shaped ends B or B¹. In the preferred embodiment, the bow-shaped projections B, B¹ extend from the rectangular frames 17, 18, a distance of about 3 inches and the prongs 19-24 project approximately two inches basket-inwardly, but other dimensions can be used within the scope of the invention. Furthermore, the two sets of three prongs for the assemblies 11, 12 can be varied, whereby more or less prongs may be attached to the fingers 13, 14, as desired. The fingers 13, 14 and the prongs 19-24 are chromed-plated stainless steel and, in the disclosed embodiment, consist of seventeen fingers for each set spaced preferably about three inches apart, which allows for the improved spit basket 10 and prongs 19-24 to accommodate a whole pig, lamb, several turkeys, approximately a dozen chickens and/or approximately 100 pounds or more of pork loin. The use of the prongs 19-24 in combination with the finger assemblies 11, 12, reduces meat droppage and shredding during cooking. This allows the carcass to be cooked without loss of meat into the fire source below. The adjustment at 15, 16 also allows for the finger assemblies 11, 12 to be moved toward each other as the meat shrinks during cooking to retain a secure grip.

While the invention has been disclosed in connection with an improvement toward. telescoping finger assemblies, other spit basket arrangements having differently formed finger configurations fall within the scope of the invention as claimed in the claims appended hereto.

Accordingly, the disclosed embodiment is not intended to limit the invention and the attached claims will be found to have a broad range of equivalents.

What is claimed is:

1. In a spit basket for use in rotisserie-type outdoor cooking devices of the type wherein the spit basket comprises opposing sets of food-holding fingers having end projections extending basket-inwardly for a distance and a long axis of rotation, the improvement comprising a plurality of double-skewer, U-shaped, prongs extending basket-inwardly from and relative to each set of food-holding fingers said prongs being staggered longitudinally relative to each other and each has a base of the U-shape thereof attached to at least two adjacent food-holding fingers, the double-skewers extending transversely to the long axis of rotation, and the double-skewers of the prongs extend basket-inwardly at a distance less than said end projections of said food-holding fingers.

2. The improvement as in claim 1 wherein the prongs comprise more than one prong at each opposing set of food-holding fingers and being staggered so as to not oppose each other across said spit basket.

3. The improvement as in claim 1 wherein said spit basket comprises two opposing adjustable frame assemblies carrying each thereon one set of said food-holding fingers and said frame assemblies being adjustable to close toward one another for securing a food item to be cooked therebetween and wherein said prongs are movable with the frame assemblies for piercing the food item to be cooked for securement thereof.

4. The improvement as claimed in claim 1 wherein said food-holding fingers have opposingly bent bowed ends wherein said bowed ends of each said set bow toward one another.

5. The improvement as claimed in claim 4 wherein said prongs comprise at least three prongs attached to each said set of food-holding fingers.

6. For use in a spit basket of the type having a long axis and opposing sets of bow-shaped food-retaining fingers having basket-inwardly extending bowed ends extending for a distance and the sets of food-retaining fingers connected by adjustable means for relative motion of the sets of fingers toward or away from each other, the improvement comprising a plurality of U-shaped double-skewer prongs longitudinally staggered with respect to the basket and each being attached to two adjacent fingers and extending interiorly of the spit basket for a distance less than said bowed ends of the sets of fingers and transversely to said basket long axis.

7. The device as claimed in claim 6 wherein said opposing sets of food-retaining fingers are staggered to be capable of telescoping past each other during adjustment of the spit basket to move of the sets of fingers toward each other whereby to be capable of moving past one another without abutment.

8. The device as claim in claim 6 wherein the prongs comprise at least three double-skewer prongs engaged at each said set of fingers and spaced thereon to be staggered whereby prongs at either of said sets of fingers are not opposingly directed to each other.

9. The device as claimed in claim 6 wherein the sets of fingers comprise a plurality of evenly spaced-apart fingers having said bowed ends forming food retention means.

10. The device as claimed in claim 9 wherein said bowed ends project at about three inches from said fingers and wherein said double-skewer prongs extend interiorly of the spit basket approximately two inches from said sets of fingers.

11. The device as claimed in claim 6 wherein said prongs a base of the U-Shape weld-engaged to straddle and be engaged to said two adjacent fingers at each said set of fingers.

12. The device as claimed in claim 6 wherein the adjustment means include rectangular frames, said sets of fingers each being attached to one of said rectangular frames and said double-skewer prongs being attached to said sets of fingers to be spaced inwardly from long sides of said rectangular frames, each said double-skewer prong being spaced from the closest long side of said rectangular frame about the same distance all other said double-skewer prongs are spaced from their respective closest long side of said rectangular frame.

* * * * *